(12) United States Patent
Luo et al.

(10) Patent No.: US 10,798,461 B2
(45) Date of Patent: Oct. 6, 2020

(54) METHOD FOR SWITCHING CONTROL MODES OF A SMART TV SET, DEVICE AND COMPUTER READABLE MEDIUM

(71) Applicant: BAIDU ONLINE NETWORK TECHNOLOGY (BEIJING) CO., LTD., Beijing (CN)

(72) Inventors: Junnan Luo, Beijing (CN); Jing Li, Beijing (CN); Zhixi Chen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 47 days.

(21) Appl. No.: 16/180,393

(22) Filed: Nov. 5, 2018

(65) Prior Publication Data

US 2019/0281361 A1    Sep. 12, 2019

(30) Foreign Application Priority Data

Mar. 9, 2018 (CN) .......................... 2018 1 0194526

(51) Int. Cl.
*H04N 21/482* (2011.01)
*H04N 21/422* (2011.01)
(Continued)

(52) U.S. Cl.
CPC ....... *H04N 21/482* (2013.01); *H04N 21/4104* (2013.01); *H04N 21/42203* (2013.01);
(Continued)

(58) Field of Classification Search
CPC .......... H04N 21/482; H04N 21/42203; H04N 21/42204
See application file for complete search history.

(56) References Cited

U.S. PATENT DOCUMENTS

2013/0033643 A1\* 2/2013 Kim ................. H04N 21/42203
348/563
2013/0325453 A1\* 12/2013 Levien .................... G10L 21/00
704/201
(Continued)

FOREIGN PATENT DOCUMENTS

CN           2814830 Y      9/2006
CN         202014321 U     10/2011
(Continued)

OTHER PUBLICATIONS

First Office Action from CN app. No. 201810194526.6, dated Mar. 14, 2019 with English translation from Global Dossier.
(Continued)

*Primary Examiner* — Pankaj Kumar
*Assistant Examiner* — Alexander Boyd
(74) *Attorney, Agent, or Firm* — Ladas & Parry, LLP

(57) ABSTRACT

The present disclosure provides a method for switching control modes of a smart TV, a device and a computer readable medium. The method comprises: collecting a user's first triggering operation when the smart TV set is in a first control mode; according to a preset switching operation corresponding to a first control mode, verifying whether a first triggering operation is a switching operation for switching the first control mode into a second control mode; if yes, switching the control mode of the smart TV set from the first control mode to the second control mode. The technical solution of the present embodiment may be employed to implement the switching of different control modes of the TV set so that at the same time, the smart TV set is only located in one control mode so that messy control of the smart TV set will not be caused, and the control efficiency of the smart TV set is effectively improved.

18 Claims, 3 Drawing Sheets

(51) Int. Cl.
*H04N 21/442* (2011.01)
*H04N 21/41* (2011.01)
*H04N 21/431* (2011.01)

(52) U.S. Cl.
CPC ... *H04N 21/42204* (2013.01); *H04N 21/4312* (2013.01); *H04N 21/44222* (2013.01)

(56) References Cited

U.S. PATENT DOCUMENTS

| | | | |
|---|---|---|---|
| 2016/0269671 A1 | 1/2016 | Shah et al. | |
| 2017/0110128 A1* | 4/2017 | Zhang | G10L 15/1815 |
| 2017/0195610 A1 | 7/2017 | Moon | |

FOREIGN PATENT DOCUMENTS

| CN | 102843598 A | 12/2012 |
|---|---|---|
| CN | 103489447 A | 1/2014 |
| CN | 103648048 A | 3/2014 |
| CN | 104347072 A | 2/2015 |
| CN | 105933961 A | 9/2016 |
| JP | 2013122709 A | 6/2013 |
| JP | 2014002719 A | 1/2014 |
| JP | 2014093090 A | 5/2014 |
| JP | 2014126600 A | 7/2014 |
| JP | 2015137478 A | 7/2015 |

OTHER PUBLICATIONS

Second Office Action from CN app. No. 201810194526.6, dated Jun. 12, 2019 with machine English translation from Google Translate.
Notice of Reasons for Refusal from JP app. No. 2018-238114, dated Nov. 18, 2019, with English translation provided by Global Dossier.
Notice of Reasons for Refusal from JP app. No. 2018-238114, dated Mar. 23, 2020, with English translation provided by Global Dossier.

* cited by examiner

METHOD FOR SWITCHING CONTROL MODES OF A SMART TV SET, DEVICE AND COMPUTER READABLE MEDIUM

The present application claims the priority of Chinese Patent Application No. 201810194526.6, filed on Mar. 9, 2018, with the title of "Method for switching control modes of a smart TV set, device and computer readable medium". The disclosure of the above application is incorporated herein by reference in its entirety.

FIELD OF THE DISCLOSURE

The present disclosure relates to the technical field of computer application, and particularly to a method for switching control modes of a smart TV set, a device and a computer readable medium.

BACKGROUND OF THE DISCLOSURE

Along with development of technologies such as Automatic Speech Recognition (ASR) of far-field speech and Natural Language Understanding (NLU), interaction under future TV set scenario may be mainly controlled by far-field speech to liberate the user's hands and directly reach a layer desired by the user, which may well improve the user's experience.

However, speech interact performs undesirably under the following scenarios. For example, at night, speech interaction disturbs other persons' rest; when the user is in a completely relaxed state, for example at killTime, he is too lazy to speak; persons with language barriers cannot complete speech interaction. At this time, certain inconvenience is caused to the control of TV set via speech. Based on the above problems, it is necessary to use a remote controller peripherally arranged for the smart TV set as a supplemental control manner to implement the control for the smart TV set. It is known in conjunction with a current TV set control method mainly with control via a remote controller and auxiliary with speech control that when the smart TV set is controlled in current multiple control modes, multiple control modes coexist and achieve mutual complementation.

However, when multiple control modes of the smart TV set coexist, if control instructions sent in multiple control modes are received simultaneously, messy control might be caused, and effective control of the smart TV set is not enabled.

SUMMARY OF THE DISCLOSURE

The present disclosure provides a method for switching control modes of a smart TV set, a device and a computer readable medium, to avoid messy control jointly caused by multiple control modes of the smart TV set, and effectively control the smart TV set.

The present disclosure provides a method for switching control modes of a smart TV set, the method comprising:

collecting a user's first triggering operation when the smart TV set is in a first control mode;

according to a preset switching operation corresponding to a first control mode, verifying whether a first triggering operation is a switching operation for switching the first control mode into a second control mode;

if yes, switching the control mode of the smart TV set from the first control mode to the second control mode.

Further optionally, in the above method, the first control mode is a speech control mode, and the second control mode is a remote controller control mode;

after switching the control mode of the smart TV set from the first control mode to the second control mode, the method further comprises:

setting a state identification bit of the smart TV set as a remote controller state; and/or moving the focus in a current interface of a screen of the smart TV set from a transparent control to a preset element obtaining the focus the first in the current interface.

Further optionally, in the above method, the collecting a user's first triggering operation when the smart TV set is in a first control mode specifically comprises:

collecting a user-sent speech instruction of entering a remote controller control mode when the smart TV set is in the speech control mode;

the step of, according to a preset switching operation corresponding to a first control mode, verifying whether a first triggering operation is a switching operation for switching the first control mode into a second control mode specifically comprises:

performing speech recognition and natural language understanding for the user-sent speech instruction of entering a remote controller control mode, to obtain an intention of the user's speech instruction;

according to a preset switching operation corresponding to the speech control mode, verifying whether the intention of the user's speech instruction is a switching operation for switching the speech control mode to the remote controller control mode.

Further optionally, in the above method, the collecting a user's first triggering operation when the smart TV set is in a first control mode specifically comprises:

collecting a specific triggering operation performed by user for the remote controller when the smart TV set is in the speech control mode;

the step of, according to a preset switching operation corresponding to a first control mode, verifying whether a first triggering operation is a switching operation for switching the first control mode into a second control mode specifically comprises:

according to a preset switching operation corresponding to the speech control mode, verifying whether the specific triggering operation performed by user for the remote controller is a switching operation for switching the speech control mode to the remote controller control mode.

Further optionally, in the above method, the collecting a user's first triggering operation when the smart TV set is in a first control mode specifically comprises:

collecting a trigger instruction sent by the user by pressing a specific key of the remote controller when the smart TV set is in the speech control mode;

the step of, according to a preset switching operation corresponding to a first control mode, verifying whether a first triggering operation is a switching operation for switching the first control mode into a second control mode specifically comprises:

according to a preset switching operation corresponding to the speech control mode, verify whether the trigger instruction sent by the user by pressing a specific key of the remote controller is a switching operation for switching the speech control mode to the remote controller control mode.

Further optionally, in the above method, the first control mode is the remote controller control mode, and the second control mode is the speech control mode;

after switching the control mode of the smart TV set from the first control mode to the second control mode, the method further comprises:

setting a state identification bit of the smart TV set as a speech state; and/or moving the focus in a current interface on a screen of the smart TV set to a transparent control so that the screen presents an effect that the focus disappears.

Further optionally, in the above method, the collecting a user's first triggering operation when the smart TV set is in a first control mode specifically comprises:

collecting an awakening speech instruction sent by the user when the smart TV set is in the remote controller control mode;

the step of, according to a preset switching operation corresponding to a first control mode, verifying whether a first triggering operation is a switching operation for switching the first control mode into a second control mode specifically comprises:

according to a preset switching operation corresponding to the remote controller control mode, verifying whether the awakening speech instruction includes an awakening word of the smart TV set; if yes, determining that the user-sent awakening speech instruction is a switching operation for switching the remote controller mode to the speech control mode.

Further optionally, in the above method, the collecting a user's first triggering operation when the smart TV set is in a first control mode specifically comprises:

collecting a time length from time when the user operates the key last time to a current moment when the smart TV set is in the remote controller control mode;

the step of, according to a preset switching operation corresponding to a first control mode, verifying whether a first triggering operation is a switching operation for switching the first control mode into a second control mode specifically comprises:

according to a preset switching operation corresponding to the remote controller control mode, verifying whether the time length reaches a preset time length threshold; if yes, determining that stopping the triggering operation by the user is the switching operation for switching the remote controller control mode to the speech control mode.

Further optionally, in the above method, after switching the control mode of the smart TV set from the first control mode to the second control mode, the method further comprises:

collecting a user's second triggering operation when the smart TV set is in a second control mode;

according to the preset switching operation corresponding to the second control mode, verify whether the second triggering operation is a switching operation for switching the second control mode to the first control mode;

if yes, switching the control mode of the TV set from the second control mode to the first control mode.

The present disclosure provides a smart TV set apparatus, the apparatus comprising:

a collecting module configured to collect a user's first triggering operation when the smart TV set is in a first control mode;

a verifying module configured to, according to a preset switching operation corresponding to a first control mode, verify whether a first triggering operation is a switching operation for switching the first control mode into a second control mode;

a switching module configured to, if yes, switch the control mode of the smart TV set from the first control mode to the second control mode.

Further optionally, in the above apparatus, the first control mode is a speech control mode, and the second control mode is a remote controller control mode; the apparatus further comprises:

a setting module configured to set a state identification bit of the smart TV set as a remote controller state; and/or a focus processing module configured to move the focus in a current interface of a screen of the smart TV set from a transparent control to a preset element obtaining the focus the first in the current interface.

Further optionally, in the above apparatus, the collecting module is specifically configured to collect a user-sent speech instruction of entering a remote controller control mode when the smart TV set is in the speech control mode;

the verifying module is specifically configured to:

perform speech recognition and natural language understanding for the user-sent speech instruction of entering a remote controller control mode, to obtain an intention of the user's speech instruction;

according to a preset switching operation corresponding to the speech control mode, verify whether the intention of the user's speech instruction is a switching operation for switching the speech control mode to the remote controller control mode.

Further optionally, in the above apparatus, the collecting module is specifically configured to collect a specific triggering operation performed by user for the remote controller when the smart TV set is in the speech control mode;

the verifying module is specifically configured to, according to a preset switching operation corresponding to the speech control mode, verify whether the specific triggering operation performed by user for the remote controller is a switching operation for switching the speech control mode to the remote controller control mode.

Further optionally, in the above apparatus, the collecting module is specifically configured to collect a trigger instruction sent by the user by pressing a specific key of the remote controller when the smart TV set is in the speech control mode;

the verifying module is specifically configured to, according to a preset switching operation corresponding to the speech control mode, verify whether the trigger instruction sent by the user by pressing a specific key of the remote controller is a switching operation for switching the speech control mode to the remote controller control mode.

Further optionally, in the above apparatus, if the first control mode is the remote controller control mode, and the second control mode is the speech control mode;

the setting module is specifically configured to set a state identification bit of the smart TV set as a speech state; and/or the focus processing module is specifically configured to move the focus in a current interface on a screen of the smart TV set to a transparent control so that the screen presents an effect that the focus disappears.

Further optionally, in the above apparatus, the collecting module is specifically configured to collect an awakening speech instruction sent by the user when the smart TV set is in the remote controller control mode;

the verifying module is specifically configured to:

according to a preset switching operation corresponding to the remote controller control mode, verify whether the awakening speech instruction includes the awakening word of the smart TV set; if yes, determine that the user-sent awakening speech instruction is a switching operation for switching the remote controller mode to the speech control mode.

Further optionally, in the above apparatus, the collecting module is specifically configured to collect a time length from time when the user operates the key last time to a current moment when the smart TV set is in the remote controller control mode;

the verifying module is specifically configured to, according to a preset switching operation corresponding to the remote controller control mode, verify whether the time length reaches a preset time length threshold; if yes, determine that stopping the triggering operation by the user is the switching operation for switching the remote controller control mode to the speech control mode.

Further optionally, in the above apparatus, after switching the control mode of the smart TV set from the first control mode to the second control mode, the collecting module is further configured to collect a user's second triggering operation when the smart TV set is in a second control mode;

the verifying module is further configured to, according to the preset switching operation corresponding to the second control mode, verify whether the second triggering operation is a switching operation for switching the second control mode to the first control mode;

the switching module is further configured to, if yes, switch the control mode of the TV set from the second control mode to the first control mode.

The present disclosure further provides a computer device, the device comprising:
one or more processors;
a storage for storing one or more programs;
the one or more programs, when executed by said one or more processors, enable said one or more processors to implement the abovementioned method for switching control modes of a smart TV set.

The present disclosure further provides a computer readable medium on which a computer program is stored, the program, when executed by a processor, implementing the abovementioned method for switching control modes of a smart TV set.

According to the method for switching control modes of a smart TV set, a device and a computer readable medium of the present disclosure, it is possible to collect a user's first triggering operation when the smart TV set is in a first control mode; according to a preset switching operation corresponding to a first control mode, verify whether the first triggering operation is the switching operation for switching the first control mode into a second control mode; if yes, switch the control mode of the smart TV set from the first control mode to the second control mode. The technical solution of the present embodiment may be employed to implement the switching of different control modes of the TV set so that at the same time, the smart TV set is only located in one control mode so that messy control of the smart TV set will not be caused, and the control efficiency of the smart TV set is effectively improved.

DETAILED DESCRIPTION OF PREFERRED EMBODIMENTS

The present disclosure will be described in detail with reference to figures and specific embodiments to make objectives, technical solutions and advantages of the present disclosure more apparent.

Figure 1:
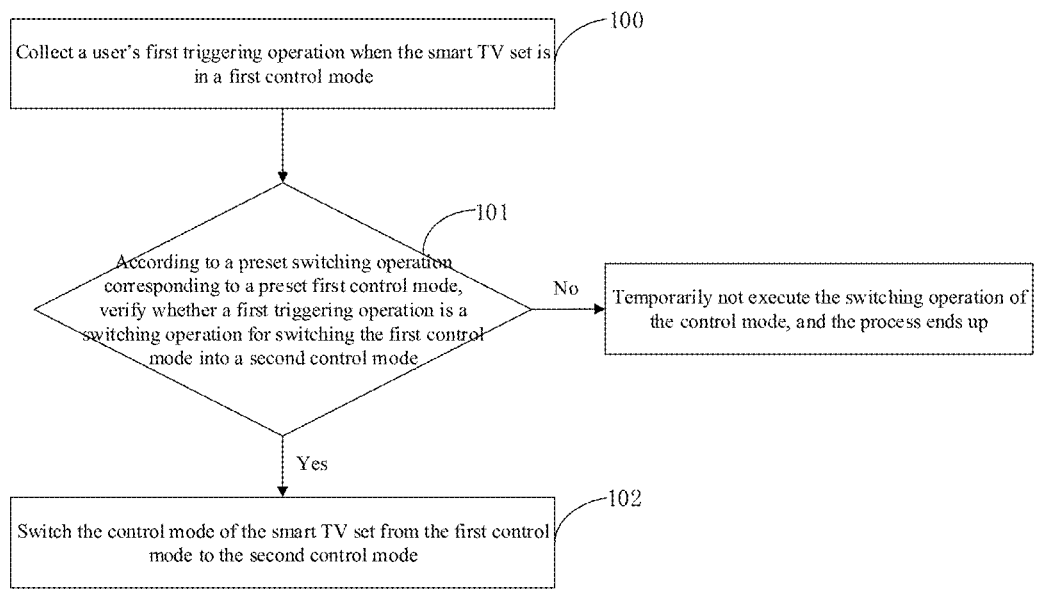
FIG. 1 is a flow chart of an embodiment of a method for switching control modes of a smart TV set according to the present disclosure.

FIG. 1 is a flow chart of an embodiment of a method for switching control modes of a smart TV set according to the present disclosure. As shown in FIG. 1, the method for switching control modes of a smart TV set according to the present embodiment may specifically include the following steps:

100: collect a user's first triggering operation when the smart TV set is in a first control mode;

In the present embodiment, the switching of two control modes of the smart TV set is taken as an example to introduce the switching of control modes of the mart TV set. For example, the two control modes in the present embodiment may be a speech control mode and a remote controller control mode respectively, which correspond to two states of a User Interface (UI) on a screen of the smart TV set: a speech state and a controller state. In the speech state, the smart TV set cannot respond to all remote controller keys, and the UI interface does not have a focus on the UI interface and can only be controlled via speech; in the controller state, it is possible to normally respond to keys of the remote controller, and receive a small portion of speech control. An operating system carried on the smart TV set of the present embodiment may be an Android system. In practical application, it is possible to derive other control modes from the speech control mode and the remote controller mode of the smart TV set, and achieve the switching of any two control modes. Said other control modes are not listed and detailed one by one.

A subject for executing the method for switching control modes of a smart TV set according to the present embodiment is a smart TV set. Furthermore, the switching of the control mode of the smart TV set in the present embodiment is not implemented actively, but performed under certain triggering operation. For example, when the smart TV set is in a first control mode, the smart TV set may collect the user's first triggering operation. In the present embodiment, it is possible to set different first triggering operations under the first control mode according to the difference of the first control mode. Furthermore, under the same first control mode, it is possible to set one, two or more different switching operations which can trigger the first control mode to switch into the second control mode.

101: according to a preset switching operation corresponding to a first control mode, verify whether the first triggering operation is the switching operation for switching the first control mode into a second control mode; if yes, perform step 102; if no, temporarily not execute the switching operation of the control mode, and the process ends up.

102: switch the control mode of the smart TV set from the first control mode to the second control mode.

In the present embodiment, regarding any control mode, it is possible to preset one, two or multiple switching operations corresponding to the control model. As such, after the smart TV set collects the user's first triggering operation in the first control mode, it is possible to, according to one, two or more preset switching operations corresponding to the first control mode, verify whether the user's first triggering operation is the switching operation for switching the first control mode into the second control mode, and if yes, switch the control mode of the smart TV set from the first control mode to the second control mode to achieve the switching of the control mode so that the user uses the smart TV set in a single control mode, avoiding messy control of the smart TV set and improving the control efficiency of the smart TV set.

Further optionally, in the present embodiment, it is further possible to set a state identification bit in the smart TV set. After step 102 "switch the control mode of the smart TV set from the first control mode to the second control mode", the method may further include: setting the state identification bit of the TV set as a state identification bit corresponding to the second control mode. For example, if the second control mode is remote controller control, set the state identification bit of the smart TV in a way that the state identification bit corresponding to the remote controller control as the remote controller state; if the second control mode is speech control, set the state identification bit of the smart TV in a way that the state identification bit corresponding to the speech control as the speech state.

Further optionally, each control mode corresponds to special processing under the control mode. For example, under the speech control mode, since when the smart TV set is controlled via speech, the UI interface of the smart TV set needn't prompt the user where a focus of the screen is, at this time it is possible to move the focus in the screen to a transparent control in the interface so that the user cannot see the focus so that it appears that the focus disappears. If the smart TV set is controlled via the remote controller, the remote controller, upon controlling, needs to obtain the focus of the screen in the UI interface, whereupon the focus of the screen needs to be displayed in the UI interface so that the user can control via the remote controller. For example, the user may, according to the focus of the screen, select a desired element by moving the focus left and right or up and down by pressing the keys of the remote controller, to perform control operations.

Based on characteristics of the above control modes, if the first control mode is a speech control mode and the second control mode is the remote controller mode, the method, after switching the speech control mode of the TV set to the remote controller mode, may further include: moving the focus in the current interface on the screen of the smart TV set from a transparent control to a preset element obtaining the focus the first in the current interface. For example, the preset element obtaining the focus the first may be a first element in the first row and first column at a left upper corner in the current interface, or may be set as an element at other positions of the current interface according to actual needs.

If the first control mode is the remote controller control mode and the second control mode is the speech control mode, the method, after switching the remote controller control mode of the TV set to the speech control mode, may further include: moving the focus in the current interface on the screen of the smart TV set to a transparent control so that the screen presents an effect that the focus disappears.

Further optionally, after step 102 "switch the control mode of the smart TV set from the first control mode to the second control mode", it is further possible to switch the second control mode of the TV set back to the first control mode, which for example may specifically include the following steps:

(a1) collect a user's second triggering operation when the smart TV set is in a second control mode;

(b1) according to a preset switching operation corresponding to a second control mode, verify whether the second triggering operation is the switching operation for switching the second control mode into the first control mode; if yes, perform step (c1); if no, temporarily not execute the switching operation;

(c1) switch the control mode of the smart TV set from the second control mode to the first control mode.

Wherein steps (a1)-(c1) are implemented on the same principle as steps 100-102 in the embodiment as shown in FIG. 1. Reference may be made to the depictions of the above steps 100-102 for a detailed implementation process. Detailed depictions are not presented any more here.

According to the control mode switching method of the smart TV set of the present embodiment, it is possible to collect a user's first triggering operation when the smart TV set is in a first control mode; according to a preset switching operation corresponding to a first control mode, verify whether the first triggering operation is the switching operation for switching the first control mode into a second control mode; if yes, switch the control mode of the smart TV set from the first control mode to the second control mode. The technical solution of the present embodiment may be employed to implement the switching of different control modes of the TV set so that at the same time, the smart TV set is only located in one control mode so that messy control of the TV set will not be caused, and the control efficiency of the smart TV set is effectively improved.

On the basis of the technical solution of the above embodiment, several types of preset switching operations for switching the speech control mode to remote controller control manner are introduced by taking an example in which the first control mode is a speech control mode and the second control mode is the remote controller mode.

The first type: the preset switching operation for switching the speech control mode to the remote controller control mode may be a switching operation performed by the user via a speech query. For example, when the user speaks a query such as "enter the remote controller mode", the smart TV set recognizes that the user's intention is transforming to the remote controller state, and then the control mode of the smart TV set is switched from the speech control mode to the remote controller control mode. In addition, optionally, in the present embodiment, the smart TV set itself may not perform speech recognition, and instead, after collecting the user's speech query, send an audio stream of the speech query to a cloud server, and the cloud server recognizes whether the user intention is to switching to the remote controller state, and if yes, the cloud server sends a switching instruction to the client of the smart TV set, and the client of the smart TV set performs a state-switching operation after receiving the instruction.

At this time, correspondingly step 100 "collect a user's first triggering operation when the smart TV set is in a first control mode" may specifically include: collecting a user-sent speech instruction of entering a remote controller control mode when the smart TV set is in the speech control mode.

Correspondingly, step 101 "according to a preset switching operation corresponding to a first control mode, verify whether the first triggering operation is the switching operation for switching the first control mode into a second control mode" may specifically include the following steps:

(a2) perform ASR recognition and NLU processing for the user-sent speech instruction of entering a remote controller control mode, to obtain an intention of the user's speech instruction;

(b2) according to a preset switching operation corresponding to the speech control mode, verify whether the intention of the user's speech instruction is a switching operation for switching the speech control mode to the remote controller control mode.

That is to say, if the preset switching operation corresponding to the speech control mode includes: the user inputs, via speech, an intention to switch the speech control mode to the remote controller control mode, switching the speech control mode to the remote controller control mode; it is possible to, according to the preset switching operation corresponding to the speech control mode, verify that the intention of the user's current speech instruction is to switch the speech control mode to the remote controller control mode, and then determine that the user's first triggering operation is a preset switching operation for switching the speech control mode to the remote controller control mode, whereupon it is possible to directly switch the smart TV set from the speech control mode to the remote controller control mode.

The second type: the preset switching operation for switching the speech control mode to the remote controller control mode may be that the user shakes the remote controller in a designated manner, for example, the user may shake up and down, or shake left and right, or shake in other manners. As such, after the user shakes the remote controller in a designated manner, a sensor built in the remote controller senses the user's shake in the designated manner, the remote controller may send an "enter the remote controller state" message to the smart TV set. The manner in which the remote controller sends the message to the smart TV set is an agreed message transmission manner conforming to a connection manner between the remote controller and the smart TV set. After receiving the message, the smart TV set may notify the message to an application layer through an Android broadcasting mechanism, and the application layer receives performs a state transforming operation after receiving the message.

At this time, correspondingly step 100 "collect a user's first triggering operation when the smart TV set is in a first control mode" may specifically include: collecting a specific triggering operation performed by user for the remote controller when the smart TV set is in the speech control mode.

Correspondingly, step 101 "according to a preset switching operation corresponding to a first control mode, verify whether the first triggering operation is the switching operation for switching the first control mode into a second control mode" may specifically include the following step: according to a preset switching operation corresponding to the speech control mode, verifying whether the specific triggering operation performed by user for the remote controller is a switching operation for switching the speech control mode to the remote controller control mode.

That is to say, if the preset switching operation corresponding to the speech control mode includes: when the remote controller shakes in a designated manner and triggers the message "enter the remote controller state", switching the speech control mode to the remote controller control mode; according to the preset switching operation, verify that the message sent by the remote controller is the message "enter the remote controller state", and reversely infer that the remote controller is shaken by the user in a designated manner, thereby determining that the user's first triggering operation is a preset switching operation for switching the speech control mode to the remote controller control mode, whereupon the smart TV set may be directly switched from the speech control mode to the remote controller control mode.

The third type: the preset switching operation for switching the speech control mode to the remote controller control mode may be a triggering instruction sent by the user by pressing a specific key on the remote controller. In this case, it is necessary to monitor an event of a specific key on the remote controller when the smart TV set is in the speech control mode, and neglect other keys. When it is monitored that the specific key is pressed, the state transforming operation is performed. Sometimes, to prevent the user's misoperation, it is possible to set in the present embodiment in a way that the state transformation is triggered when a plurality of keys are pressed continuously in a certain order, whereupon the smart TV set may buffer preceding events upon monitoring the key event to judge whether the state transforming operation is hit.

At this time, correspondingly step 100 "collect a user's first triggering operation when the smart TV set is in a first control mode" may specifically include: collecting a trigger instruction sent by the user by pressing a specific key of the remote controller when the smart TV set is in the speech control mode; at this time, the trigger instruction sent by a non-designated key is also shielded when the smart TV set in the speech control mode, and cannot be received.

Correspondingly, step 101 "according to a preset switching operation corresponding to a first control mode, verify whether the first triggering operation is the switching operation for switching the first control mode into a second control mode" may specifically include the following step: according to a preset switching operation corresponding to the speech control mode, verifying whether the trigger instruction sent by the user by pressing a specific key of the remote controller is a switching operation for switching the speech control mode to the remote controller control mode.

That is to say, if the preset switching operation corresponding to the speech control mode includes: when the user sends the trigger instruction by pressing a specific key of the remote controller, switching the speech control mode to the remote controller control mode; since the trigger instruction sent by a non-designated key cannot be received when the smart TV set in the speech control mode. At this time, so long as the smart TV set receives trigger instructions sent by pressing one, two or more designated keys in turn, it is possible to determine that the user's first triggering operation is a preset switching operation for switching the speech control mode to the remote controller control mode, whereupon the smart TV set may be directly switched from the speech control mode to the remote controller control mode.

Likewise, if the first control mode is the remote controller control mode and the second control mode is the speech control mode, there also exists a switching operation for switching the remote controller control mode to the speech control mode, for example, including the following cases:

The fourth type: the preset switching operation for switching the remote controller control mode to the speech control mode may be that the user awakens the smart TV set via speech. In the remote controller state, if the user uses an awakening word of the smart TV set to awaken the smart TV set, immediately trigger the smart TV set to switch from the remote controller control mode to the speech control mode.

At this time, correspondingly step 100 "collect a user's first triggering operation when the smart TV set is in a first control mode" may specifically include: collecting an awakening speech instruction sent by the user when the smart TV set is in the remote controller control mode;

Correspondingly, step 101 "according to a preset switching operation corresponding to a first control mode, verify whether the first triggering operation is the switching operation for switching the first control mode into a second control mode" may specifically include the following step: according to a preset switching operation corresponding to the remote controller control mode, verifying whether the awakening speech instruction includes the awakening word of the smart TV set; if yes, determining that the user-sent awakening speech instruction is a switching operation for switching the remote controller mode to the speech control mode.

Specifically, it is possible to, upon use, preset the awakening word to the smart TV set, and store it in the smart TV set. When the smart TV set standbys or in the remote controller control mode, when the user calls the awakening word of the smart TV set via speech, the smart TV set may determine itself is called according to the pre-stored awakening word, then it is possible to awaken the smart TV set from the standby state, or trigger the smart TV set to switch from the remote controller control mode to the speech control mode. In the present embodiment, the awakening word stored in the smart TV set may be an English or Chinese word, or pronunciation of the Chinese word.

Correspondingly, the preset switching operation corresponding to the remote controller control mode according to the present embodiment may include: switching the smart TV set from the remote controller control mode to the speech control mode if the speech awakening instruction sent by the user is detected. Specifically, the speech awakening instruction sent by the user and collected by the smart TV set includes speech of the awakening word. The smart TV set performs ASR recognition for the awakening speech instruction to obtain a corresponding word instruction, for example, when the awakening word is Chinese, the recognized word instruction may be pronunciation of the Chinese word; then it is possible to, according to the pre-stored awakening word, verify whether the word instruction includes the awakening word of the smart TV set; if yes, determining the user-sent awakening speech instruction is a switching operation for switching the remote controller control mode into the speech control mode, whereupon the smart TV set may be directly switched from the remote controller control mode to the speech control mode.

In addition, optionally, in the present embodiment, it is possible to store the awakening word of the smart TV set in the cloud server. After the smart TV set collects the speech awakening instruction, audio stream of the speech awakening instruction may be directly sent to the cloud server, and the cloud server verifies whether the speech awakening instruction includes the awakening word of the smart TV set. A specific verification manner is the same as the verification manner of the above smart TV set. When the cloud server verifies that the speech awakening instruction includes the awakening word of the smart TV set, send to a client of the smart TV set a switching instruction for switching the remote controller control mode to the speech control mode. The smart TV set, according to the switching instruction, switches the control mode from the remote controller control mode to the speech control mode.

The fifth type: the preset switching operation for switching the remote controller control mode to the speech control mode may be monitoring whether a time period since the time of pressing a key of the remote controller last time reaches a certain time length threshold, and if yes, performing the switching operation. That is, in the remote controller state, whenever the pressing of a key of the remote controller is monitored, a timer is refreshed. When time set by the timer ends up, the state transforming operation is triggered.

At this time, correspondingly step 100 "collect a user's first triggering operation when the smart TV set is in a first control mode" may specifically include: collecting a time length from time when the user operates the key last time to a current moment when the smart TV set is in the remote controller control mode;

Correspondingly, step 101 "according to a preset switching operation corresponding to a first control mode, verify whether the first triggering operation is the switching operation for switching the first control mode into a second control mode" may specifically include the following step: according to a preset switching operation corresponding to the remote controller control mode, verifying whether the time length reaches a preset time length threshold; if yes, determining that stopping the triggering operation by the user is the switching operation for switching the remote controller control mode to the speech control mode.

The preset switching operation corresponding to the remote controller control mode according to the present embodiment may include: if detecting the time length from time when the user operates the key last time to a current moment reaches the preset time length threshold, this indicates that the user does not want to manipulate the remote controller again, and the smart TV set may be switched from the remote controller control mode to the speech control mode. Upon use, it is feasible to preset and store the time length threshold in the smart TV set. Furthermore, when the key pressing instruction of the remote controller is received each time, it is possible to activate a time, then detect the time length from time when the key of the remote controller is operated last time to a current moment, and judge whether the time length reaches the pre-stored time length threshold, and if yes, determine that the user's triggering operation is a switching operation for switching the remote controller control mode to the speech control mode, whereupon the smart TV set may be directly switched from the remote controller control mode to the speech control mode. The user's triggering operation according to the present embodiment is an operation of not operating the key of the remote controller within a preset time length threshold. The size of the preset time length threshold can be set according to practical experience and actual demands, and will not be limited here.

It needs to be appreciated that in practical application, to facilitate use, it is feasible to set the speech control mode as a default control mode, and set the remote controller control mode as a supplementary control mode. Reference may be made to depictions of the above embodiment for the switching between the two modes. Certainly, in practical application, other control modes may also be set. The switching between any two control modes may be implemented according to features under respective control modes.

A typical scenario of the embodiment of the present disclosure is: after the young and middle-aged user groups arrive home at night after work, their interaction with the smart TV set each time involves speech awakening+speech instruction. At this time, the loudness of the speech not only disturb family members who already go to bed but also deprives you who are fatigued after one day's work of a right to watch TV program for a while quietly (lazy to speak).

At this time, the user may speak an instruction similar to "enter the remote controller mode" to the TV set, or may shake the remote controller in his hand, or click a direction key of the remote controller, or complete a designated gesture to enter the remote controller mode. If there is a person who has a language barrier, it is also possible to recognize the person's image through the TV set's camera, and automatically enter a non-speech interaction mode (namely, the remote controller mode). Meanwhile, the focus of the smart TV set originally concealed is awakened to facilitate the user using a remote controller to operate. The use is very convenient. Furthermore, there is only one control mode at the same moment, which does not cause messy control and can effectively control the smart TV set.

Figure 2:
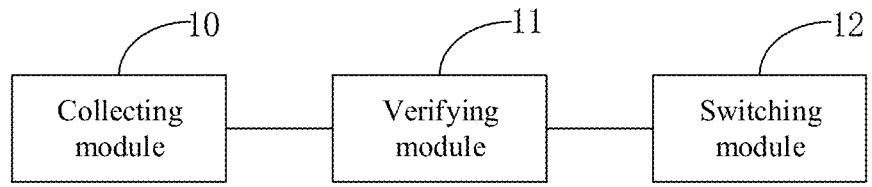
FIG. 2 is a structural diagram of Embodiment 1 of a smart TV set apparatus according to the present disclosure.

FIG. 2 is a structural diagram of Embodiment 1 of a smart TV set apparatus according to the present disclosure. As shown in FIG. 2, the smart TV set apparatus as shown in FIG. 2 may specifically comprise:

a collecting module 10 configured to collect a user's first triggering operation when the smart TV set is in a first control mode;

a verifying module 11 configured to, according to a preset switching operation corresponding to a first control mode, verify whether a first triggering operation collected by the collecting module 10 is a switching operation for switching the first control mode into a second control mode;

a switching module 12 configured to, if the verifying module 11 verifies that the first triggering operation is a switching operation for switching the first control mode into the second control mode, switch the control mode of the smart TV set from the first control mode to the second control mode.

Principles employed by the smart TV set apparatus according to the present embodiment to implement the switching of the control mode of the smart TV set using the above modules and the resultant technical effects are the same as those of the above-mentioned method embodiments. For particulars, please refer to the depictions of the aforesaid relevant method embodiments, and no detailed depictions will be presented here.

Figure 3:
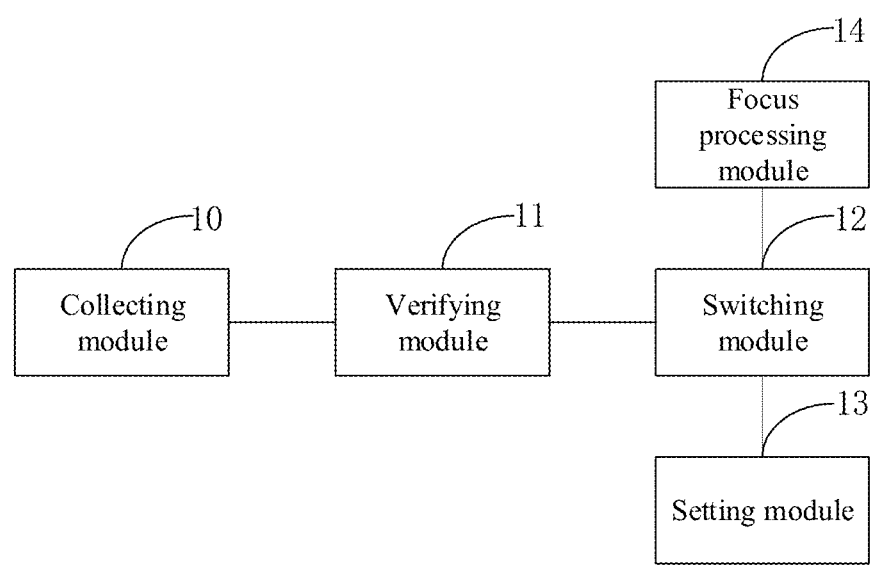
FIG. 3 is a structural diagram of Embodiment 2 of a smart TV set apparatus according to the present disclosure.

FIG. 3 is a structural diagram of Embodiment 2 of a smart TV set apparatus according to the present disclosure. As shown in FIG. 3, the smart TV set apparatus according to the present embodiment further includes the following technical solution on the basis of the technical solution of the embodiment shown in FIG. 2.

In the smart TV set apparatus in the present embodiment, the first control mode under a first scenario may be a speech control mode, and the second control mode may be a remote controller control mode. The smart TV set apparatus according to the present embodiment further comprises: a setting module 13 and/or a focus processing module 14.

After switching module 12 switches the control mode of the smart TV set from the first control mode to the second control mode, the setting module 13 is triggered to activate, and the setting module 13 is configured to set a state identification bit of the smart TV set as a remote controller state;

after switching module 12 switches the control mode of the smart TV set from the first control mode to the second control mode, the focus processing module 14 is triggered to activate, and the focus processing module 14 is configured to move the focus in a current interface of the screen of the smart TV set from a transparent control to a preset element obtaining the focus the first in the current interface.

Further optionally, in the smart TV set apparatus of the present embodiment, the collecting module 10 is specifically configured to collect a user-sent speech instruction of entering a remote controller control mode when the smart TV set is in the speech control mode;

the verifying module 11 is specifically configured to:
perform speech recognition and natural language understanding for the user-sent speech instruction of entering a remote controller control mode collected by the collecting module 10, to obtain an intention of the user's speech instruction;

according to a preset switching operation corresponding to the speech control mode, verify whether the intention of the user's speech instruction is a switching operation for switching the speech control mode to the remote controller control mode.

Or further optionally, in the smart TV set apparatus of the present embodiment, the collecting module 10 is specifically configured to collect a specific triggering operation performed by user for the remote controller when the smart TV set is in the speech control mode;

the verifying module 11 is specifically configured to, according to a preset switching operation corresponding to the speech control mode, verify whether the specific triggering operation collected by collecting module 10 and performed by user for the remote controller is a switching operation for switching the speech control mode to the remote controller control mode.

Or further optionally, in the smart TV set apparatus of the present embodiment, the collecting module 10 is specifically configured to collect a trigger instruction sent by the user by pressing a specific key of the remote controller when the smart TV set is in the speech control mode;

the verifying module 11 is specifically configured to, according to a preset switching operation corresponding to the speech control mode, verify whether the trigger instruction collected by the collecting module 10 and sent by the user by pressing a specific key of the remote controller is a switching operation for switching the speech control mode to the remote controller control mode.

Or further optionally, in the second scenario of the smart TV set of the present embodiment, the first control mode may be the remote controller control mode, and the second control mode may be the speech control mode;

correspondingly, in the second scenario, the setting module 13 is specifically configured to set a state identification bit of the smart TV set as a speech state; and/or the focus processing module 14 is specifically configured to move the focus in the current interface on the screen of the smart TV set to a transparent control so that the screen presents an effect that the focus disappears.

Further optionally, in the second scenario of the smart TV set of the present embodiment, the collecting module 10 is specifically configured to collect an awakening speech instruction sent by the user when the smart TV set is in the remote controller control mode;

the verifying module 11 is specifically configured to:
according to a preset switching operation corresponding to the remote controller control mode, verify whether the awakening speech instruction collected by the collecting module 10 and sent by the user includes the awakening word of the smart TV set; if yes, determine that the user-sent awakening speech instruction is a switching operation for switching the remote controller mode to the speech control mode.

Or further optionally, in the second scenario of the smart TV set of the present embodiment, the collecting module 10 is specifically configured to collect a time length from time when the user operates the key last time to a current moment when the smart TV set is in the remote controller control mode;

the verifying module 11 is specifically configured to, according to a preset switching operation corresponding to the remote controller control mode, verify whether the time length collected by the collecting module 10 reaches a preset time length threshold; if yes, determine that stopping the triggering operation by the user is the switching operation for switching the remote controller control mode to the speech control mode.

Further optionally, in the smart TV set of the present embodiment, the collecting module 10 is further configured to collect a user's second triggering operation when the smart TV set is in a second control mode;

the verifying module 11 is specifically configured to, according to the preset switching operation corresponding to the second control mode, verify whether the second triggering operation collected by the collecting module 10 is a switching operation for switching the second control mode to the first control mode;

the switching module 12 is further configured to, if the verifying module 11 verifies that the second triggering module is a switching operation for switching the second control mode to the first control mode, switch the control mode of the TV set from the second control mode to the first control mode.

Principles employed by the smart TV set apparatus according to the present embodiment to implement the switching of the control mode of the smart TV set using the above modules and the resultant technical effects are the same as those of the above-mentioned method embodiments. For particulars, please refer to the depictions of the aforesaid relevant method embodiments, and no detailed depictions will be presented here.

Figure 4:
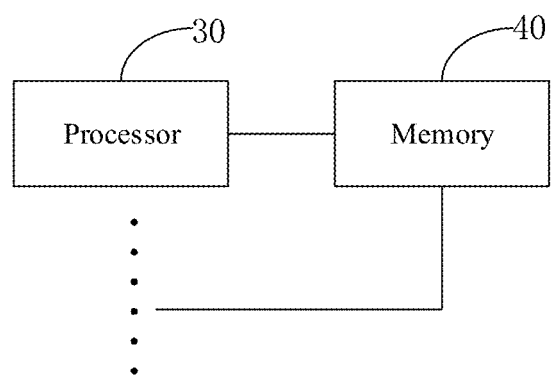
FIG. 4 is a block diagram of an embodiment of a computer device according to the present disclosure.

FIG. 4 is a block diagram of an embodiment of a computer device according to the present disclosure. As shown in FIG. 4, the computer device according to the present embodiment comprises: one or more processors 30, and a memory 40 for storing one or more programs; the one or more programs stored in the memory 40, when executed by said one or more processors 30, enable said one or more processors 30 to implement the method for switching control modes of a smart TV set in the embodiment as shown in FIG. 1. The embodiment as shown in FIG. 4 comprises a plurality of processors 30.

Figure 5:
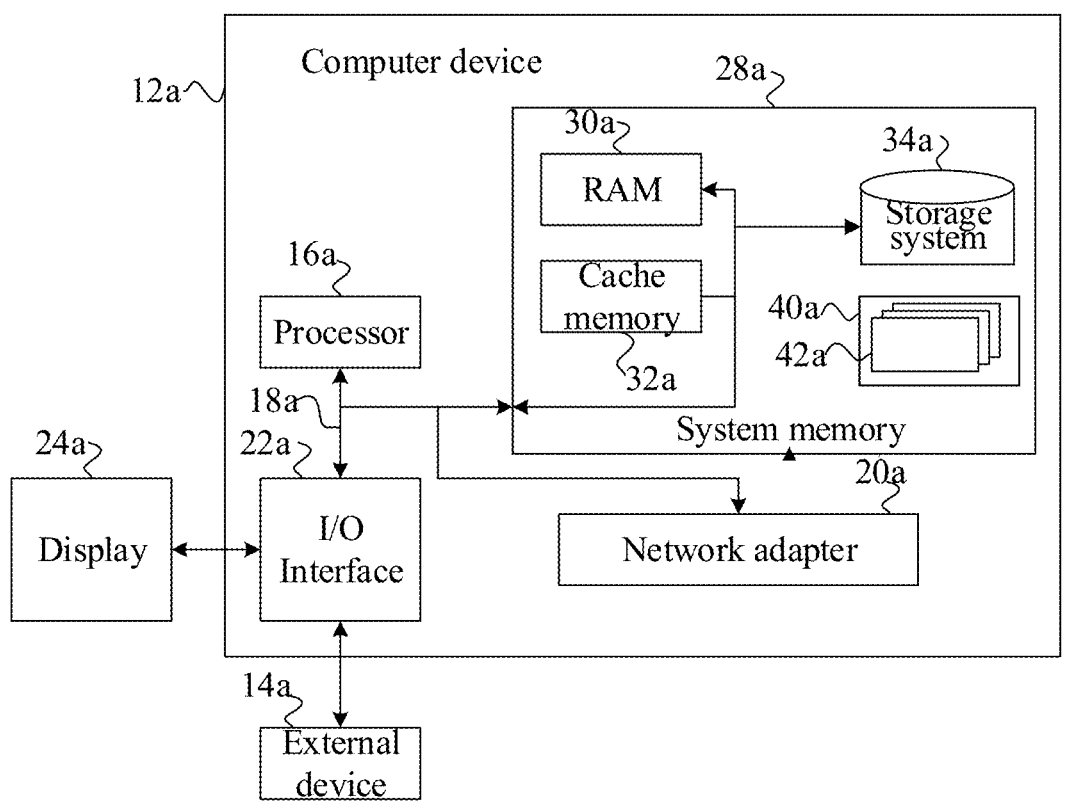
FIG. 5 is an example diagram of a computer device according to the present disclosure.

For example, FIG. 5 is an example diagram of a computer device according to an embodiment of the present disclosure. FIG. 5 shows a block diagram of an example computer device 12a adapted to implement an implementation mode of the present disclosure. The computer device 12a shown in FIG. 5 is only an example and should not bring about any limitation to the function and scope of use of the embodiments of the present disclosure.

As shown in FIG. 5, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1-FIG. 3 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 3 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 5, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the method for switching control modes of a smart TV set as shown in the above embodiments.

The present disclosure further provides a computer readable medium on which a computer program is stored, the program, when executed by a processor, implementing the method for switching control modes of a smart TV set as shown in the above embodiments.

The computer readable medium of the present embodiment may include RAM 30a, and/or cache memory 32a and/or a storage system 34a in the system memory 28a in the embodiment shown in FIG. 5.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for switching control modes of a smart TV set, wherein the method comprises:
    collecting a user's first triggering operation when the smart TV set is in a first control mode;
    according to a preset switching operation corresponding to the first control mode, verifying whether a first triggering operation is a switching operation for switching the first control mode into a second control mode;
    if yes, switching the control mode of the smart TV set from the first control mode to the second control mode,
    wherein when the first control mode is a remote controller control mode, and the second control mode is a speech control mode,
    the collecting a user's first triggering operation when the smart TV set is in a first control mode specifically comprises:
    collecting a time length from time when the user operated a key last time to a current moment when the smart TV set is in the remote controller control mode;
    the step of, according to a preset switching operation corresponding to the first control mode, verifying whether a first triggering operation is a switching operation for switching the first control mode into a second control mode specifically comprises:
    according to a preset switching operation corresponding to the remote controller control mode, verifying whether the time length reaches a preset time length threshold; if yes, determining that stopping the triggering operation by the user is the switching operation for switching the remote controller control mode to the speech control mode.

2. The method according to claim 1, wherein when the first control mode is the speech control mode, and the second control mode is the remote controller control mode;
after switching the control mode of the smart TV set from the first control mode to the second control mode, the method further comprises:
setting a state identification bit of the smart TV set as a remote controller state; and/or
moving a focus in a current interface of a screen of the smart TV set from a transparent control to a preset element obtaining firstly the focus in the current interface.

3. The method according to claim 2, wherein when the first control mode is the speech control mode, and the second control mode is the remote controller control mode, the collecting a user's first triggering operation when the smart TV set is in a first control mode specifically comprises:
collecting a user-sent speech instruction of entering a remote controller control mode when the smart TV set is in the speech control mode;
the step of, according to a preset switching operation corresponding to the first control mode, verifying whether a first triggering operation is a switching operation for switching the first control mode into a second control mode specifically comprises:
performing speech recognition and natural language understanding for the user-sent speech instruction of entering a remote controller control mode, to obtain an intention of the user's speech instruction;
according to a preset switching operation corresponding to the speech control mode, verifying whether the intention of the user's speech instruction is a switching operation for switching the speech control mode to the remote controller control mode.

4. The method according to claim 2, wherein when the first control mode is the speech control mode, and the second control mode is the remote controller control mode, the collecting a user's first triggering operation when the smart TV set is in a first control mode specifically comprises:
collecting a specific triggering operation performed by a user for a remote controller when the smart TV set is in the speech control mode;
the step of, according to a preset switching operation corresponding to the first control mode, verifying whether a first triggering operation is a switching operation for switching the first control mode into a second control mode specifically comprises:
according to a preset switching operation corresponding to the speech control mode, verifying whether the specific triggering operation performed by the user for the remote controller is a switching operation for switching the speech control mode to the remote controller control mode.

5. The method according to claim 2, wherein when the first control mode is the speech control mode, and the second control mode is the remote controller control mode, the collecting a user's first triggering operation when the smart TV set is in a first control mode specifically comprises:
collecting a trigger instruction sent by the user by pressing a specific key of a remote controller when the smart TV set is in the speech control mode;
the step of, according to a preset switching operation corresponding to the first control mode, verifying whether a first triggering operation is a switching operation for switching the first control mode into a second control mode specifically comprises:
according to a preset switching operation corresponding to the speech control mode, verify whether the trigger instruction sent by the user by pressing a specific key of the remote controller is a switching operation for switching the speech control mode to the remote controller control mode.

6. The method according to claim 1, wherein when the first control mode is the remote controller control mode, and the second control mode is the speech control mode;
after switching the control mode of the smart TV set from the first control mode to the second control mode, the method further comprises:
setting a state identification bit of the smart TV set as a speech state; and/or
moving a focus in a current interface on a screen of the smart TV set to a transparent control so that the screen presents an effect that the focus disappears.

7. The method according to claim 6, wherein when the first control mode is the remote controller control mode, and the second control mode is the speech control mode, the collecting a user's first triggering operation when the smart TV set is in a first control mode specifically comprises:
collecting an awakening speech instruction sent by the user when the smart TV set is in the remote controller control mode;
the step of, according to a preset switching operation corresponding to the first control mode, verifying whether a first triggering operation is a switching operation for switching the first control mode into a second control mode specifically comprises:
according to a preset switching operation corresponding to the remote controller control mode, verifying whether the awakening speech instruction includes an awakening word of the smart TV set; if yes, determining that the user-sent awakening speech instruction is a switching operation for switching the remote controller control mode to the speech control mode.

8. The method according to claim 1, wherein after switching the control mode of the smart TV set from the first control mode to the second control mode, the method further comprises:
collecting a user's second triggering operation when the smart TV set is in the second control mode;
according to the preset switching operation corresponding to the second control mode, verify whether the second triggering operation is a switching operation for switching the second control mode to the first control mode;
if yes, switching the control mode of the TV set from the second control mode to the first control mode.

9. A computer device, wherein the device comprises:
one or more processors,
a storage for storing one or more programs,
the one or more programs, when executed by said one or more processors, enable said one or more processors to implement a method for switching control modes of a smart TV set, wherein the method comprises:
collecting a user's first triggering operation when the smart TV set is in a first control mode;
according to a preset switching operation corresponding to the first control mode, verifying whether a first triggering operation is a switching operation for switching the first control mode into a second control mode;
if yes, switching the control mode of the smart TV set from the first control mode to the second control mode,
wherein when the first control mode is a remote controller control mode, and the second control mode is a speech control mode, the collecting a user's first triggering operation when the smart TV set is in a first control mode specifically comprises:
    collecting a time length from time when the user operated a key last time to a current moment when the smart TV set is in the remote controller control mode;
    the step of, according to a preset switching operation corresponding to the first control mode, verifying whether a first triggering operation is a switching operation for switching the first control mode into a second control mode specifically comprises:
    according to a preset switching operation corresponding to the remote controller control mode, verifying whether the time length reaches a preset time length threshold; if yes, determining that stopping the triggering operation by the user is the switching operation for switching the remote controller control mode to the speech control mode.

10. The computer device according to claim 9, wherein when the first control mode is the speech control mode, and the second control mode is the remote controller control mode;
    after switching the control mode of the smart TV set from the first control mode to the second control mode, the method further comprises:
    setting a state identification bit of the smart TV set as a remote controller state; and/or
    moving a focus in a current interface of a screen of the smart TV set from a transparent control to a preset element obtaining firstly the focus in the current interface.

11. The computer device according to claim 10, wherein when the first control mode is the speech control mode, and the second control mode is the remote controller control mode, the collecting a user's first triggering operation when the smart TV set is in a first control mode specifically comprises:
    collecting a user-sent speech instruction of entering a remote controller control mode when the smart TV set is in the speech control mode;
    the step of, according to a preset switching operation corresponding to the first control mode, verifying whether a first triggering operation is a switching operation for switching the first control mode into a second control mode specifically comprises:
    performing speech recognition and natural language understanding for the user-sent speech instruction of entering a remote controller control mode, to obtain an intention of the user's speech instruction;
    according to a preset switching operation corresponding to the speech control mode, verifying whether the intention of the user's speech instruction is a switching operation for switching the speech control mode to the remote controller control mode.

12. The computer device according to claim 10, wherein when the first control mode is the speech control mode, and the second control mode is the remote controller control mode, the collecting a user's first triggering operation when the smart TV set is in a first control mode specifically comprises:
    collecting a specific triggering operation performed by a user for a remote controller when the smart TV set is in the speech control mode;
    the step of, according to a preset switching operation corresponding to the first control mode, verifying whether a first triggering operation is a switching operation for switching the first control mode into a second control mode specifically comprises:
    according to a preset switching operation corresponding to the speech control mode, verifying whether the specific triggering operation performed by the user for the remote controller is a switching operation for switching the speech control mode to the remote controller control mode.

13. The computer device according to claim 10, wherein when the first control mode is the speech control mode, and the second control mode is the remote controller control mode, the collecting a user's first triggering operation when the smart TV set is in a first control mode specifically comprises:
    collecting a trigger instruction sent by the user by pressing a specific key of a remote controller when the smart TV set is in the speech control mode;
    the step of, according to a preset switching operation corresponding to the first control mode, verifying whether a first triggering operation is a switching operation for switching the first control mode into a second control mode specifically comprises:
    according to a preset switching operation corresponding to the speech control mode, verify whether the trigger instruction sent by the user by pressing a specific key of the remote controller is a switching operation for switching the speech control mode to the remote controller control mode.

14. The computer device according to claim 9, wherein when the first control mode is the remote controller control mode, and the second control mode is the speech control mode;
    after switching the control mode of the smart TV set from the first control mode to the second control mode, the method further comprises:
    setting a state identification bit of the smart TV set as a speech state; and/or
    moving a focus in a current interface on a screen of the smart TV set to a transparent control so that the screen presents an effect that the focus disappears.

15. The computer device according to claim 14, wherein when the first control mode is the remote controller control mode, and the second control mode is the speech control mode, the collecting a user's first triggering operation when the smart TV set is in a first control mode specifically comprises:
    collecting an awakening speech instruction sent by the user when the smart TV set is in the remote controller control mode;
    the step of, according to a preset switching operation corresponding to the first control mode, verifying whether a first triggering operation is a switching operation for switching the first control mode into a second control mode specifically comprises:
    according to a preset switching operation corresponding to the remote controller control mode, verifying whether the awakening speech instruction includes an awakening word of the smart TV set; if yes, determining that the user-sent awakening speech instruction is a switching operation for switching the remote controller control mode to the speech control mode.

16. The computer device according to claim 1, wherein after switching the control mode of the smart TV set from the first control mode to the second control mode, the method further comprises:
    collecting a user's second triggering operation when the smart TV set is in the second control mode;

according to the preset switching operation corresponding to the second control mode, verify whether the second triggering operation is a switching operation for switching the second control mode to the first control mode;

if yes, switching the control mode of the TV set from the second control mode to the first control mode.

17. A non-transitory computer readable medium on which a computer program is stored, wherein the program, when executed by a processor, implements a method for switching control modes of a smart TV set, wherein the method comprises:

collecting a user's first triggering operation when the smart TV set is in a first control mode;

according to a preset switching operation corresponding to the first control mode, verifying whether a first triggering operation is a switching operation for switching the first control mode into a second control mode;

if yes, switching the control mode of the smart TV set from the first control mode to the second control mode, wherein when the first control mode is a remote controller control mode, and the second control mode is a speech control mode, the collecting a user's first triggering operation when the smart TV set is in a first control mode specifically comprises:

collecting a time length from time when the user operated a key last time to a current moment when the smart TV set is in the remote controller control mode;

the step of, according to a preset switching operation corresponding to the first control mode, verifying whether a first triggering operation is a switching operation for switching the first control mode into a second control mode specifically comprises:

according to a preset switching operation corresponding to the remote controller control mode, verifying whether the time length reaches a preset time length threshold; if yes, determining that stopping the triggering operation by the user is the switching operation for switching the remote controller control mode to the speech control mode.

18. The non-transitory computer readable medium according to claim 17, wherein the first control mode is a speech control mode, and the second control mode is a remote controller control mode;

after switching the control mode of the smart TV set from the first control mode to the second control mode, the method further comprises:

setting a state identification bit of the smart TV set as a remote controller state; and/or moving a focus in a current interface of a screen of the smart TV set from a transparent control to a preset element obtaining firstly the focus in the current interface.

* * * * *